(No Model.) 2 Sheets—Sheet 1.
H. B. LONG.
MILK AERATOR.
No. 489,164. Patented Jan. 3, 1893.
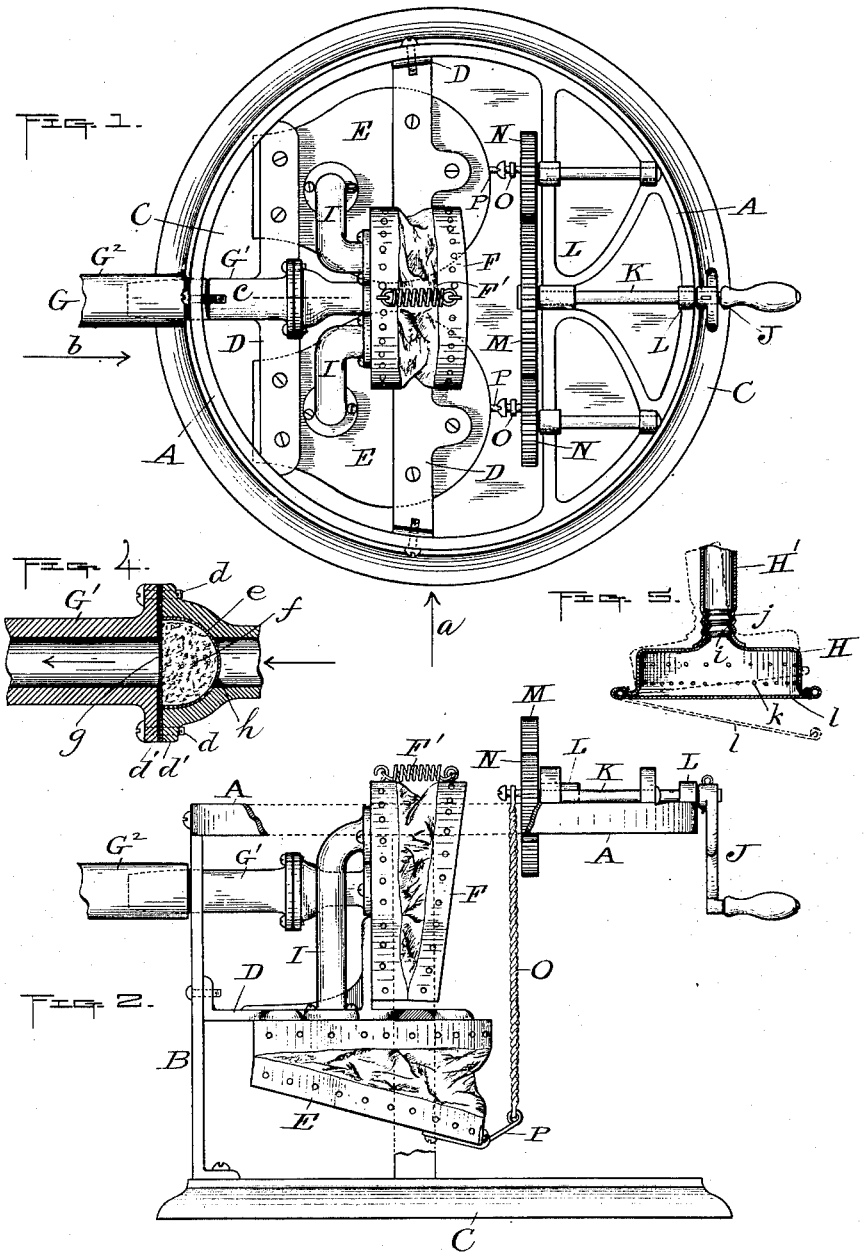
Witnesses,
W. B. Nourse,
G. Forrest Wesson
Inventor,
Horace B. Long.
By A. A. Barker, Att'y.

(No Model.) 2 Sheets—Sheet 2.
H. B. LONG.
MILK AERATOR.
No. 489,164. Patented Jan. 3, 1893.
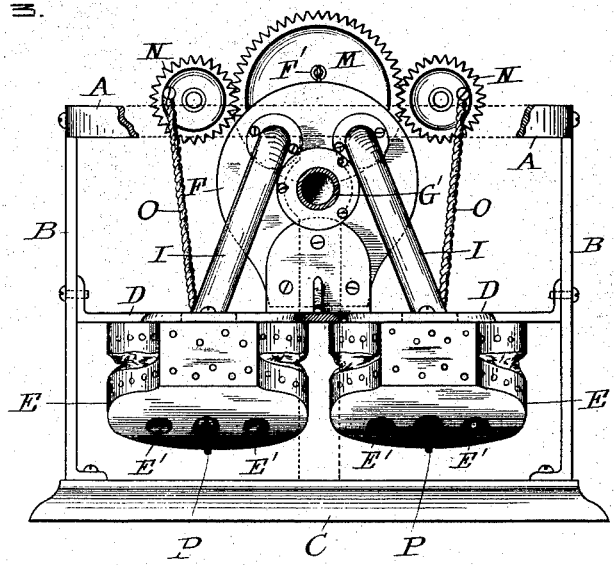
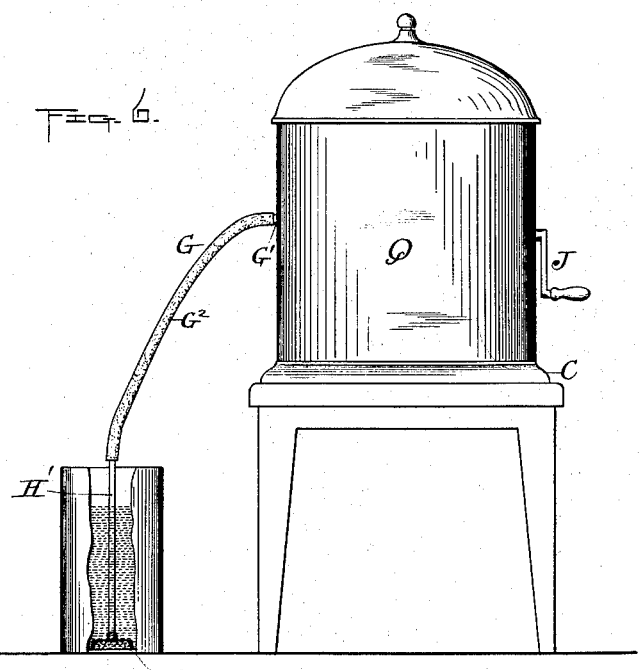
Witnesses,
W. B. Nourse.
C. Forrest Nasson.
Inventor,
Horace B. Long.
By A. A. Barker, Att'y

UNITED STATES PATENT OFFICE.

HORACE B. LONG, OF WORCESTER, MASSACHUSETTS, ASSIGNOR OF ONE-HALF TO GEORGE S. BOUTELLE, OF SAME PLACE.

MILK-AERATOR.

SPECIFICATION forming part of Letters Patent No. 489,164, dated January 3, 1893.

Application filed June 4, 1891. Serial No. 395,033. (No model.)

*To all whom it may concern:*

Be it known that I, HORACE B. LONG, of the city and county of Worcester, and State of Massachusetts, have invented certain new and useful Improvements in Milk-Aerators; and I do hereby declare that the following is a full, clear, and exact description thereof, reference being had to the accompanying drawings, forming a part of this specification, and in which—

Figure 1 represents a top or plan view of my improved milk aerator. Figs. 2 and 3 are side views thereof, looking in the direction indicated by arrows $a$ and $b$ respectively, Fig. 1. In said three figures the outer casing or cover, as well as the air conducting pipe and its nozzle, being left off, and part of the frame broken away in Figs. 2 and 3 for convenience of illustration. Fig. 4 is a central, longitudinal section upon an enlarged scale, of part of said air conducting pipe, and the air filterer of the apparatus, taken on line $c$, Fig. 1. Fig. 5 is a central, longitudinal section of the perforated nozzle which is placed in the milk receptacle during the operation of aerating the milk therein, and Fig. 6 represents upon a reduced scale a side view of the apparatus with the outer casing or cover over the same, said apparatus resting upon a table, and its air conducting pipe extending to a milk receptacle with the nozzle resting in the bottom thereof, part of the receptacle being broken away to more fully illustrate the parts.

My invention is designed to cool and purify milk when first taken from the cow by forcing a uniform current of pure air therethrough, which causes the extraneous or foreign matter of an obnoxious or poisonous nature to be discharged therefrom; and said invention consists of certain improvements in the construction of the apparatus employed in carrying out said result, as will be hereinafter more fully set forth.

In order that others may better understand the nature and purpose of my invention, I will now proceed to describe it more in detail.

In the drawings, A represents the frame, B B B the standards, and C the bed of the apparatus. To the standards B is secured the horizontal frame D to which are in turn secured the two horizontal bellows E E, and the vertical bellows F, being made of the proper shape to receive and support said bellows in their proper positions for operation. The horizontal bellows are for producing the air supply, and the vertical bellows for regulating or equalizing the pressure or volume thereof as it enters the conducting pipe G, and thus forcing a uniform volume of air of equal pressure into the milk through the perforated nozzle H secured to the outer extremity of said conducting pipe. The bellows E E are operated alternately in reverse directions, and thus produce a continuous flow of air through the conducting pipes I, I, into the regulating bellows F, one end of each of said pipes I I being connected with openings in the sides of the double bellows, and their other ends with openings in the single bellows. The air is drawn into said double bellows through the openings E' E' in the bottom sides thereof, and the bellows are operated in opposite directions as previously stated by turning a crank-lever J secured to a horizontal shaft K fitted to turn in suitable bearings L L on the frame A. To the inner end of said shaft is secured a spur-gear M which engages with and turns pinions N N arranged at opposite sides thereof and also fitted to turn in suitable bearings on frame A. To said pinions N N are eccentrically pivoted the upper ends of connecting rods O O, while their opposite ends are pivoted to suitable bearings P P secured to the lower or movable half of the bellows E E, said pivot connections being preferably made loose or with considerable play so as to allow them to conform to the swinging movement necessitated in opening and closing said bellows. The air inlet to the upper single bellows F as before stated is through the conducting pipes I I, and the outlet through the conducting pipe G provided with the perforated nozzle H. As the air is forced into the bellows F, the pressure caused by the resistance in forcing said air through the milk is regulated by a spiral spring F', one end of which is secured to the stationary half of the bellows, and the other end to its movable half, as is shown in Figs. 1 and 2, a strong resistance or pressure, such as caused by forcing the air through a large body of milk, causing the bellows F to be expanded and the spring serving to draw back or close said bellows as said pressure is reduced; the action of said bellows therefore being to expand and contract by the unequal pressure of the air forced in by first one and then the other of the supply bellows E E in the manner previously described. By this construction, it will be apparent, that a comparatively uniform and continuous flow of air is forced into and through the milk to aerate and discharge the offensive and injurious properties contained therein. The conducting pipe G is made with a short metal section G' secured to the bellows F over the end of which the flexible portion G² thereof is adapted to be fitted. Said metal section is furthermore made in two pieces and their abutting ends fastened by means of suitable screws or bolts d passed through lateral flanges d' formed thereon. At the junction of said two pieces is formed an air chamber e which is, in practice, filled with suitable air filtering material f preferably cotton or wool in a loose fluffy condition so that the air may be forced through it and all heterogeneous or foreign matter extracted therefrom before entering the milk; thus permitting only the purest air, perfectly filtered, being discharged into and forced through said milk.

I find, in practice, that air badly contaminated with foreign matter may be rendered of the purest quality by passing it through this filtering process. By using said device in the air passage of a milk aerator it is obvious that microbes which engender disease, as well as dust and other foreign substances may be entirely excluded from entering and contaminating the milk and thus adds an additional and important feature to the usual aerating process. The filtering material f is retained in its chamber by means of a cross-partition g of open mesh wire cloth interposed between the two abutting ends of the two pieces composing the metal section of pipe G'. If desired, said filtering material may also be placed in a wire cloth basket h fitting in the chamber e as shown in Fig. 4, but I do not limit myself thereto, as it is not an essential feature, the air current being in the direction shown by the arrows in said figure, and consequently requiring to be held only on the outer side against said air current.

The nozzle H of the apparatus is detachably fastened to a metal tube or pipe H' over the opposite end of which is fitted the outer end of the flexible conducting pipe G previously alluded to. It is thus made detachable by forming a thread on its central hub i which fits into the correspondingly threaded end j of the metal tube H' as is shown in Fig. 5 of the drawings. Said nozzle is made in the form of an inverted, covered, circular dish with a flat top and substantially vertical sides provided with a series of perforations k to allow the air to be forced out laterally around the same. The cover l is hinged so that the interior may be conveniently reached to clean the same, as required. Being thus made, it will be seen that when placed centrally in the bottom of a receptacle containing milk as is shown in Fig. 6; by the operation of the apparatus connected therewith, a volume of fresh pure air of equal, continuous power, and evenly distributed may be forced laterally through said milk and passes up through every portion of the milk from the bottom to the surface and thoroughly aerates it; thereby gradually and uniformly cooling the whole body of milk in a very short time, as well as expelling therefrom all the well-known impurities of an obnoxious or poisonous nature contained therein when taken warm from the cow and prior to subjecting the same to said aerating process.

In practice a casing or cover Q is used over the apparatus as shown in Fig. 6 but as this does not constitute a part of my invention, it not shown in any of the other figures.

The use of two alternately acting pumps or supply bellows in connection with a reservoir or receiving bellows for regulating the air pressure and obtaining a uniform flow through the discharge pipe or outlet, I am aware is not broadly new, and I therefore make no claim thereto except in combination with my improvements set forth in the claims.

Having now described my invention, what I claim as new, and desire to secure by Letters Patent is,—

1. In a milk aerator, the combination with the alternately operated supply bellows E, E, and means for actuating the same, said means consisting of the shaft K provided with the handle J, the gear wheel M, the pinions N, N, meshing with the said gear wheel, and the connecting rods O, O, attached to the said bellows and eccentrically connected with said pinions, of the reservoir bellows F arranged above the said supply bellows, the pipes I, I, connecting the said bellows E, E, with the said reservoir bellows F, the perforated nozzle H, and a conducting pipe forming a connection between the said reservoir bellows and the said nozzle, substantially as set forth.

2. In a milk aerator, the combination of the alternately operated supply bellows E, E, and means for actuating the same, said means consisting of the shaft K provided with the handle J, the gear wheel M, the pinions N, N, meshing with the said gear wheel, and the connecting rods O, O, attached to the said bellows and eccentrically connected with said pinions, of the reservoir bellows F arranged above the said supply bellows, the pipes I, I, connecting the said bellows E, E, with the said reservoir bellows F, the perforated nozzle H, and a conducting pipe forming a connection between the said reservoir bellows and the said nozzle, said conducting pipe being provided with an air filter, substantially as set forth.

HORACE B. LONG.

Witnesses:
A. A. BARKER,
W. B. NOURSE.